(12) United States Patent
Huang et al.

(10) Patent No.: US 8,094,997 B2
(45) Date of Patent: Jan. 10, 2012

(54) SYSTEMS AND METHOD FOR EMBEDDING SCENE PROCESSING INFORMATION IN A MULTIMEDIA SOURCE USING AN IMPORTANCE VALUE

(75) Inventors: Jau Hsiung Huang, Shindian (TW); Ho-Chao Huang, Shindian (TW); Mei-Chun Ku, Banciao (TW); Ming-Jun Chen, Tai Nan (TW)

(73) Assignee: Cyberlink Corp., Shindian, Taipei (TW)

( * ) Notice: Subject to any disclaimer, the term of this patent is extended or adjusted under 35 U.S.C. 154(b) by 1352 days.

(21) Appl. No.: 11/476,346

(22) Filed: Jun. 28, 2006

(65) Prior Publication Data

US 2008/0019665 A1    Jan. 24, 2008

(51) Int. Cl.
*H04N 5/783* (2006.01)
(52) U.S. Cl. ........................................ 386/344; 386/248
(58) Field of Classification Search ................ 386/46, 386/52, 68, 69, 83, 124–126, 278, 291, 343, 386/344, 248
See application file for complete search history.

(56) References Cited

U.S. PATENT DOCUMENTS

| | | | |
|---|---|---|---|
| 4,072,860 A | 2/1978 | Koleff et al. | |
| 4,775,900 A | 10/1988 | Blessinger | |
| 4,969,093 A | 11/1990 | Barker et al. | |
| 5,237,648 A | 8/1993 | Mills et al. | |
| 5,623,690 A | 4/1997 | Palmer et al. | |
| 6,034,746 A | 3/2000 | Desai et al. | |
| 6,320,588 B1 | 11/2001 | Palmer et al. | |
| 6,330,672 B1 | 12/2001 | Shur | |
| 6,337,880 B1 | 1/2002 | Cornog et al. | |
| 6,370,199 B1 | 4/2002 | Bock et al. | |
| 6,411,623 B1 | 6/2002 | DeGollando et al. | |
| 6,449,422 B1 * | 9/2002 | Ebisawa | 386/241 |
| 6,546,556 B1 | 4/2003 | Kataoka et al. | |
| 6,625,321 B1 | 9/2003 | Li et al. | |
| 6,625,581 B1 | 9/2003 | Perkowski et al. | |
| 6,867,781 B1 | 3/2005 | Van Hook et al. | |
| 7,082,255 B1 * | 7/2006 | Jun | 386/291 |
| 7,366,401 B2 * | 4/2008 | Ohmori | 386/69 |
| 2001/0025377 A1 | 9/2001 | Hinderks | |
| 2001/0026561 A1 | 10/2001 | Morris et al. | |
| 2001/0028463 A1 | 10/2001 | Iwamura | |
| 2001/0049788 A1 | 12/2001 | Shur et al. | |
| 2002/0078006 A1 * | 6/2002 | Shteyn | 707/1 |

(Continued)

FOREIGN PATENT DOCUMENTS

JP          9-312089       * 12/1997

(Continued)

OTHER PUBLICATIONS

Yamamoto et al, Machine generated translation of 2004-289513, Oct. 2004.*

(Continued)

*Primary Examiner* — David Harvey

(74) *Attorney, Agent, or Firm* — Thomas, Kayden, Horstemeyer & Risley, LLP

(57) ABSTRACT

Disclosed are systems and methods for generating and embedding scene processing information in a multimedia source. Scene processing information is generated based on an analysis of audio, video and data properties of the multimedia source. The embedded scene processing information can be extracted from the multimedia source to assist in generating playback of the multimedia source as well as generating a summarized playback of the multimedia source.

23 Claims, 4 Drawing Sheets

U.S. PATENT DOCUMENTS

| | | | |
|---|---|---|---|
| 2002/0173971 A1 | 11/2002 | Stirpe et al. | |
| 2002/0196363 A1 | 12/2002 | Furusawa et al. | |
| 2003/0079224 A1 | 4/2003 | Komar et al. | |
| 2004/0055012 A1 | 3/2004 | Kimball et al. | |
| 2004/0113933 A1 | 6/2004 | Guler | |
| 2004/0114758 A1 | 6/2004 | Carisgaard et al. | |
| 2004/0268398 A1 | 12/2004 | Fano et al. | |
| 2005/0025465 A1* | 2/2005 | Danieli | 386/125 |
| 2005/0036557 A1 | 2/2005 | Balakrishnan et al. | |
| 2005/0058483 A1 | 3/2005 | Chapman et al. | |
| 2005/0105883 A1 | 5/2005 | Holcomb et al. | |
| 2005/0195331 A1* | 9/2005 | Sugano et al. | 348/571 |
| 2005/0198570 A1* | 9/2005 | Otsuka et al. | 715/515 |
| 2005/0207730 A1 | 9/2005 | Iwamura | |
| 2006/0080716 A1* | 4/2006 | Nishikawa et al. | 725/89 |
| 2006/0112337 A1* | 5/2006 | Jung et al. | 715/723 |
| 2006/0165379 A1* | 7/2006 | Agnihotri et al. | 386/95 |
| 2006/0168631 A1* | 7/2006 | Nishikawa et al. | 725/89 |
| 2006/0222318 A1* | 10/2006 | Momosaki et al. | 386/46 |
| 2006/0233522 A1* | 10/2006 | Hiroi et al. | 386/95 |

FOREIGN PATENT DOCUMENTS

JP    2004-289513    * 10/2004

OTHER PUBLICATIONS

Nielsen et al, Machine generated translation of JP 9-312089, Dec. 1997.*

European Search Report for Patent Application No. EP 06 020 507.7.

* cited by examiner

SYSTEMS AND METHOD FOR EMBEDDING SCENE PROCESSING INFORMATION IN A MULTIMEDIA SOURCE USING AN IMPORTANCE VALUE

TECHNICAL FIELD

The present invention relates to systems and methods for processing multimedia and, more specifically, relates to systems and methods for processing multimedia corresponding to the importance of scenes of the multimedia source.

BACKGROUND OF THE INVENTION

Video content is a form of multimedia that is increasingly viewed and manipulated by consumers. With the increasing proliferation of audio and video content available to consumers via broadcast, cable, on-demand, fixed media, and other available sources of multimedia content, consumers have the ability and option to consume an ever increasing amount of content and programming. The vast amount of available programming could render it difficult for consumers to enjoy all of the content he or she desires. Also, many devices and services available in the marketplace allow consumers to record, time-shift or view on-demand video and audio content. These devices and/or services can allow a consumer to enjoy such content at a time other than their initial broadcast or delivery. Such devices and/or services can also allow a consumer to fast-forward or rewind programming which enables quicker viewing of the content or replay of certain scenes contained within the content. Further, video content is increasingly delivered via the internet or other data services in the form of downloadable content or IPTV delivered video services.

Further, the need to analyze, edit, and process digital multimedia content, for example, digital audio or digital video, has become a desired necessity for consumers recording or creating their own content. For example, a home movie may be recorded using a personal camcorder and transferred to a personal computer for processing, editing, or long-term storage. Digital camcorders, for example, record audio, video, and other information related to the home movie in digital form, such as on tape, computer memory, or a mass storage medium. The home movie may then be transferred to a personal computer using any number of interfaces, and then stored as a digital stream such as multimedia file in a number of common formats such as MPEG-1, MPEG-2, or DV, for example.

As a further example, musicians frequently record, edit, and mix audio in digital format, and therefore, commonly process audio bitstreams during the editing process. Similar to video bitstreams, audio bitstreams may include data streams such as the title, author, and copyright year in the bitstream itself. This audio may be stored as a digital stream such as multimedia file in a number of common formats such as MP3, WAV, or MPEG Audio, for example.

Unfortunately, many consumers have neither the time nor inclination to consume all such content in its entirety. The above mentioned content is frequently stored, delivered or broadcast in unedited form. That is, such content is typically not edited for brevity or even delivered with important or eventful scenes tagged or noted for their importance in a manner that allows consumers to quickly view important scenes or a summarized version of the programming.

Frequently, consumers are inclined to fast-forward recorded or on-demand programming to view the programming in a shorter period of time than its original live or unedited running time. However, simply fast-forwarding through audio or video content can render it difficult for a consumer to view scenes or events in the programming that the typical viewer may find exciting or important. For example, a soccer match may contain only a few instances of a goal being scored or a few impressive non-goal events. A consumer may miss such scenes in such content if he/she is viewing the event and attempting to shorten the amount of time to view the event by simply fast-forwarding. Further, simply fast-forwarding through audio or video content provides a consumer with a less than ideal viewing experience, particularly when saving time is a concern of the viewer.

SUMMARY OF THE INVENTION

An embodiment of the present invention may be described as a method for multimedia processing. The method may include providing a multimedia source containing audio data and video data. The method may further include embedding within the multimedia source scene processing information corresponding to the importance of scenes of the multimedia source.

Another embodiment of the present invention may be described as a computer readable medium for multimedia processing. The system may include logic for providing a multimedia source containing audio data and video data. The system may further include logic for embedding within the multimedia source scene processing information corresponding to the importance of scenes of the multimedia source.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION OF THE DRAWINGS

Reference will now be made to the drawings. While the disclosure will be provided in connection with these drawings, there is no intent to limit the disclosure to the embodiment of embodiments disclosed herein. On the contrary, the intent is to cover all alternatives, modifications, and equivalents. Disclosed herein are systems and methods for identifying for embedding scene processing information in a multimedia source. Also disclosed are systems and methods for the processing or playback of a multimedia source containing scene processing information. As noted above, consumers of multimedia content often do not have the time or are not inclined to consume such content in its entirety. Many consumers may desire to view an abbreviated version of such content or have the ability to easily summon or jump to important or exciting scenes to view "highlights" of multimedia content.

Figure 1:
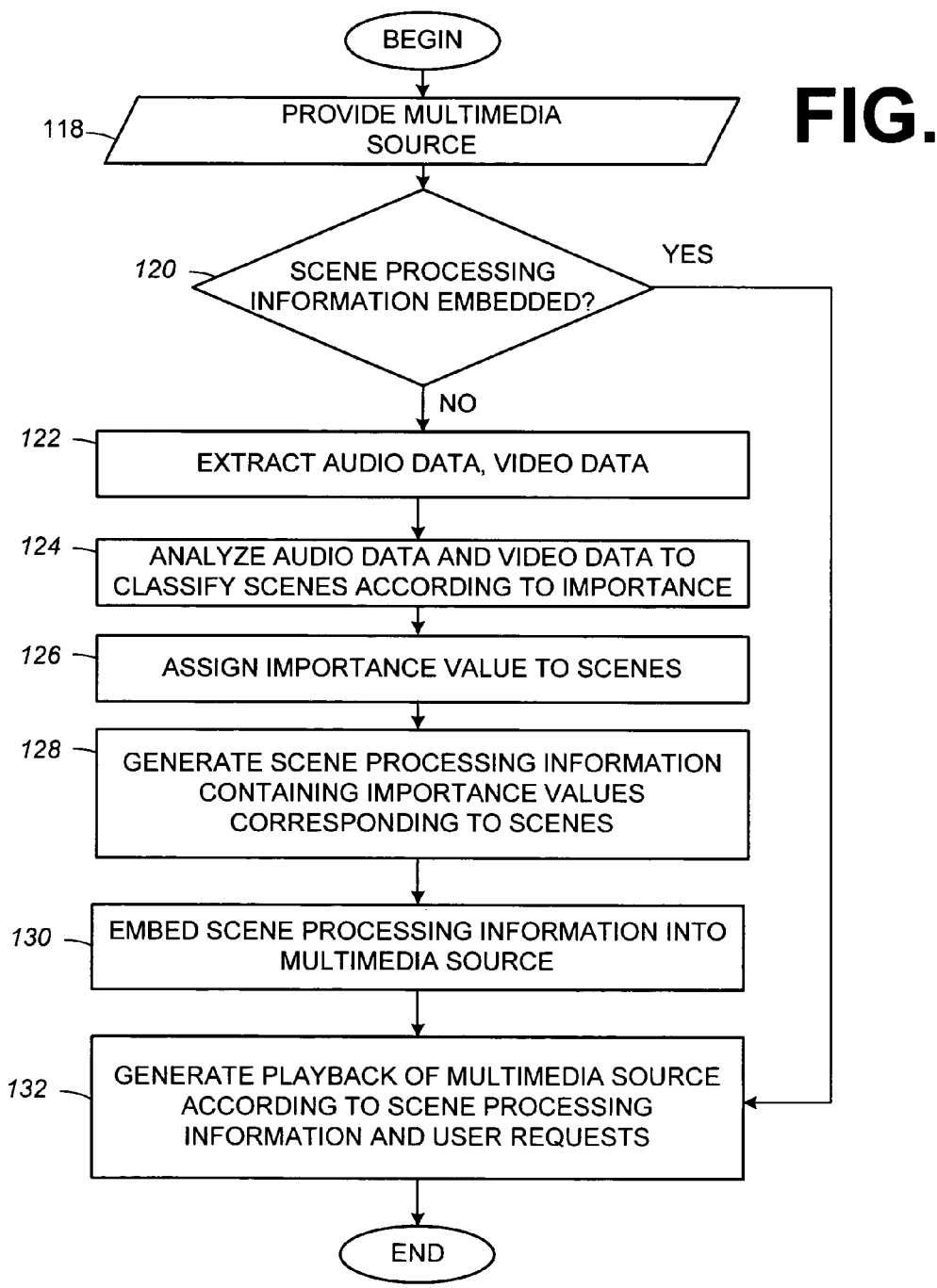
FIG. 1 depicts an exemplary method for embedding scene processing information in a provided multimedia source and generating playback of the multimedia source.

Reference is now made to FIG. 1, which depicts a flowchart illustrating an embodiment for embedding scene processing information in a multimedia source. At step 118, a multimedia source is provided, for example, by a multimedia acquisition module, which can include, but is not limited to a cable/satellite television tuner, digital video camera (DV cam) coupled to a personal computer, internet video stream, or software configured to acquire downloadable multimedia content.

A multimedia source may also be, for example, any type of file, data stream, or digital broadcast representing any combination of audio, video, data, text, pictures, etc. For example, multimedia streams may take the format of an MPEG-1 bitstream, an MPEG-2 bitstream, an MPEG-4 bitstream, an H.264 bitstream, a 3GPP bitstream, a 3GPP-2 bitstream, Standard-Definition Video (SD-Video) bitstream, a High-Definition Video (HD-Video) bitstream, a Digital Versatile Disc (DVD) multimedia bitstream, a Video Compact Disc (VCD) multimedia bitstream, a High-Definition Digital Versatile Disc (HD-DVD) multimedia bitstream, a Digital Television Video/High-definition Digital Television (DTV/HDTV) multimedia bitstream, an AVI bitstream, a WAV bitstream, a digital video (DV) bitstream, a QuickTime (QT) file, a Compact Disc Audio (CDA) bitstream, an MPEG Audio Layer III (MP3) bitstream, an MPEG Audio Layer II (MP2) bitstream, Windows Media Audio (WMA) bitstream, a Windows Media Video (WMV) bitstream, an Advanced System Format (ASF) bitstream, or any number of other popular digital multimedia formats. The above exemplary data streams are merely examples, and it is intended that the system cover any type of multimedia source in its broadest sense.

If scene processing information is not already embedded within the multimedia source provided in step 118, step 120 of the depicted embodiment determines that the multimedia source should be analyzed and scene processing information subsequently generated (the NO condition). In step 122, audio data and/or video data are extracted from the multimedia source. The audio data and/or video data extracted from the provided multimedia source are analyzed in step 124. In step 124, important scenes can be identified by analyzing pitch, energy, and/or tonality of the audio data extracted from the multimedia source. For example, exciting scenes of a sporting event, for example, can have measurable and identifiable pitch, energy, and/or tonality characteristics. In this example, these characteristics can arise from crowd or announcer noises that have identifiable and substantially unique audio properties.

The video data can also be analyzed in step 124 to identify important or exciting scenes of the multimedia source. For example, an instant reply contained within a sporting event can be identified and tagged as a non-exciting scene in the multimedia source, as an instant reply represents footage within the source that is not live footage of the sporting event. As a further non-limiting example, a potentially exciting scene in a televised soccer match may be identifiable based on the video characteristics of a ball striking and disturbing the net during a scored goal. Further, commercials may be identifiable based on varying audio and video characteristics that accompany a transition from important content to a commercial within the multimedia source. For example, the predominant color present in the video data can be tracked to assist in the detection of commercials or other aspects of scenes of the multimedia source that should be appreciated. In a multimedia source containing a soccer match, green may exist as a predominant color during portions of the multimedia source containing match footage because the match is typically played on a large grass field, whereas green may be less predominant during footage containing commercials because the same grass field is typically not present during commercials. Commercials can be classified as unimportant during the analysis of step 124.

As a further non-limiting example, in a multimedia source containing sports content, an on-screen clock or scoreboard can be analyzed to assist in the identification of important scenes. An on-screen clock or scoreboard can be analyzed to determine important scenes based on the information contained in an on-screen lock or scoreboard. For example, if a team in a soccer match scores a goal, an on-screen scoreboard may be updated with a new score to reflect the change in score of the game. In step 124, the scene containing the change in on-screen scoreboard as well as the surrounding scenes can be classified as important scenes because they likely contain the scoring of a goal.

Alternatively, certain scenes of a exemplary multimedia source containing a soccer match can be classified as important regardless of whether there is a change in game score. For example, in step 124, the beginning of a half in a soccer match and the subsequent scenes can be classified as important scenes based on the fact that an on-screen clock may indicate the beginning or the end of a half of play. Similarly, the midpoint or end of a half, or possibly even extra time of a soccer match can likewise be classified as important scenes based on solely on the reading and/or analysis of an on-screen clock. It should be appreciated that an on-screen clock or scoreboard may reveal other aspects of a multimedia source containing sports content that could cause a scene to be classified as an important scene. It should further be appreciated that a clock or scoreboard may not necessarily exist in every frame of the multimedia source, and can thus be analyzed only when present in scenes of the multimedia source.

In step 124, a scene can include a group of frames or a predefined span of the multimedia source. As a non-limiting example, a span of 0.5 seconds of the provided multimedia source can be analyzed as a single scene, which is a span that can include a plurality of frames of the multimedia source.

In step 126, importance values can be assigned to scenes of the multimedia source. In this regard, following the analysis of step 124, step 126 can assign numerical values relating to the importance or excitement of the scenes of the source. In step 128, scene processing information is generated. Scene processing information can include the importance values mentioned above as well as other information useful for processing scenes of the multimedia source. As a non-limiting example, the beginning and end of commercials can be noted as well as more detailed information about a scene in addition to an importance value. For example, in a multimedia source containing soccer, scenes containing the scoring of a goal can be marked as such so that a user quickly view only the goal scoring moments of such a source should he/she desire.

As another non-limiting example, chapter marks can be generated to place within scene processing information to indicate chapters. These chapter marks can be determined by the analysis step 124. For example, in a multimedia source containing sports content, a chapter mark can be generated at the end of each period of play, which is typically identifiable by a whistle or buzzer and followed by a commercial. A chapter marking can be generated to allow a user to quickly jump to the next chapter or the next period of play. Chapter markings can also be generated in step 128 at or near scenes that are exciting or have been assigned an importance value corresponding to high importance or excitement in step 126. The scene processing information can be formatted into at least one and preferably a plurality of data blocks that can be subsequently embedded in the multimedia source in step 130 below.

Scene processing information is embedded into the multimedia source in step 130. The scene processing information can be embedded by multiplexing data blocks generated in step 128 with audio, video and other data contained in a multimedia source that comprises an MPEG-2 stream, for example. Scene processing may also be embedded at the beginning or end of the multimedia source. In step 132, playback of the provided multimedia source can be generated in response to user requests and according to the embedded scene processing information. As noted above, a user may wish to view a summarized version of the provided multimedia source. Accordingly, in step 132 and in conjunction with the embedded scene processing information, the user can view scenes with an importance value above a threshold importance value. These scenes can include frames of the multimedia source that exist in the multimedia source before and after the scenes possessing a high importance value so that the user can view scenes leading up to and immediately after an exciting or important scene. A user may also select a summarized playback of the provided multimedia source of a desired length and in step 132, scenes with the highest importance values can be chosen until the length of the summarized playback is substantially equivalent to the desired length.

Figure 2:
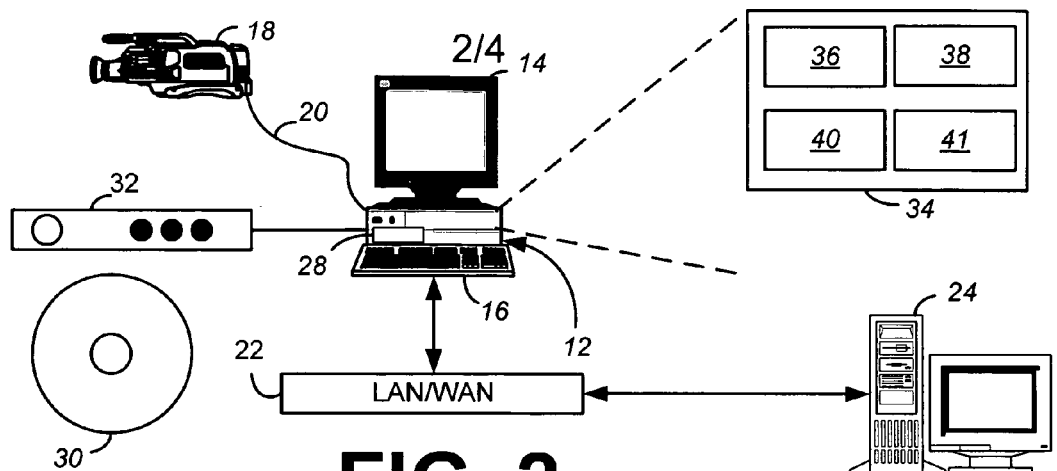
FIG. 2 depicts an exemplary system for embedding scene processing information in a multimedia source.

As another non-limiting example, a user can jump to important or exciting scenes that are delineated by chapter markings generated in step 128. As noted above, chapter markings can be generated to mark scenes with an importance value exceeding an importance value threshold. A user may then have the ability to jump to scenes that are marked with such chapter markings. Reference is now made to FIG. 2, which depicts a system for embedding scene processing information in a multimedia source including a computer system 12 having a display 14 and user input device 16, which may be a keyboard or a mouse, for example. A video camera 18 may be coupled to computer system 12 via an electrical cable 20 or a wireless connection. Video camera 18 may, for example, be a digital camcorder which records multimedia content in a variety of digital formats. In this embodiment, electrical cable 20 may be any number of common computer interface cables, such as, but not limited to IEEE-1394 High Performance Serial Bus (Firewire), Universal Serial Bus (USB), a serial connection, or a parallel connection. In this embodiment, a digital multimedia source may be transferred from video camera 18 to computer system 12 over electrical cable 20.

Computer system 12 may also form a node on a network 22 such as, but not limited to a LAN or a WAN. In this configuration, multimedia sources may be delivered from a remote server 24 over network 22 to computer system 12. The connection between the remote server 24 and computer system 12 may be any number of physical networking interfaces such as a CAT-5, Firewire, or wireless connection. Computer system 12 may also include optical drive 28 to receive and read optical disk 30, which may have multimedia sources encoded thereon.

In some embodiments, a multimedia source may be downloaded to the computer using multimedia input device 32 which may be a break-out box, or could be integrated onto an expansion card, either of which are electrically connected to computer system 12. Multimedia input device 32 may include a variety of standard digital or analog input connections for receiving multimedia signals such as, but not limited to, RCA jacks, a microphone jack, Sony/Philips Digital Interface (S/PDIF) connections, optical connections, coaxial cable, and S-video connections. Multimedia input device 32 may include an analog-to-digital converter for converting analog multimedia to digital multimedia sources. In an embodiment in which multimedia input device 32 is a break-out box external to computer system 12, the box is electrically connected in an number of ways, for example, but not limited to, Firewire, USB, a serial connection, or a parallel connection.

Computer system 12 includes a memory 34 which may be used to store a number of executable modules therein. In this embodiment, a multimedia acquisition module 36, multimedia analyzing module 38, scene processing module 40, and playback module 41 is stored therein. Memory 34 may include a number of other modules which, for example, could be sub-modules of multimedia acquisition module 36, multimedia analyzing module 38, scene processing module 40, and playback module 41.

Multimedia acquisition module 36 may acquire a multimedia source in a number of ways, depending on the source. For example, multimedia acquisition module 36 may coordinate the transfer of a multimedia source from video camera 18, optical disc 28, remote server 24, or a mass storage device 48 (FIG. 3) to computer system 12. Multimedia acquisition module 36 also provides the multimedia source to executable modules such as multimedia analyzing module 38, and scene processing module 40.

Multimedia analyzing module 38 may be used for analyzing audio and video content within a multimedia source. For example, multimedia analyzing module 38 may be used for detecting scene change positions and values, analyzing the importance of scenes, analyzing the excitement of scenes, determining where to place chapter marks, detecting commercials, and detecting other aspects of the multimedia source. Multimedia analyzing module 38 may also generate an importance value for scenes of a multimedia source as part of the scene processing information that corresponds to the importance or excitement of a scene by analyzing audio and video characteristics of the source. For example, in a multimedia source containing sports content, certain exciting or important scenes can be identified by analyzing the pitch, energy, or tonality of the audio data in the scene.

Multimedia analyzing module 38 may be configured to embed the results obtained from analyzing the audio and/or video into the multimedia source. In this regard, multimedia analyzing module 38 embeds scene processing information into the multimedia source. As noted above in reference to the method depicted in FIG. 1, an exemplary way that scene processing information can be embedded into the multimedia source by multiplexing the information with the audio, video and/or data portion of a multimedia source. For example, many multimedia formats and standards, such as MPEG-2, offer a data portion in addition to audio and video portions, allowing data such as the scene processing information to be stored within the stream without altering the audio and data portions. In this regard, the scene processing information may be embedded in accordance with a particular multimedia format without altering the perceivable audio and/or video contained within a multimedia source.

Scene processing module 40 allows a user of the system, in conjunction with playback module 41, to manipulate how a multimedia source is viewed using the system. A user of the system can interact with or submit requests to a playback module 41, which can be represented by a user interface, to view or generate playback of the multimedia source. For example, because important or exciting scenes of the multimedia source can be identified and scene processing information is embedded in the multimedia source by multimedia analyzing module 38, a viewer may wish to view a summarized or condensed playback of the multimedia source. Scene processing module 40 can generate a summarized playback by allowing a viewer interacting with playback module 41 to view only the scenes of the multimedia source having an importance value exceeding an importance value threshold or those that are tagged as exciting and/or important scenes. Further, scene processing module 40 may allow a user to jump to important or exciting scenes in conjunction with chapter marks embedded in the multimedia source as a part of the scene processing information or by jumping to a scene with an importance value exceeding an importance value threshold.

Note that in some embodiments, multimedia acquisition module 36, multimedia analyzing module 38, scene processing module 40, and playback module 41 may be combined into a single module that performs any combination of the tasks performed by each of the modules separately. Thus, any modules or submodules described herein are not limited to existing as separate modules. In reality all modules may operate apart from one another, or could easily be combined as one module.

In some embodiments, a user may interact and control the operation of multimedia acquisition module 36, multimedia analyzing module 38, scene processing module 40, and playback module 41 through user input device 16 and a graphical user interface within display 14.

Each of the multimedia acquisition module 36, multimedia analyzing module 38, scene processing module 40, playback module 41 and any sub-modules, may comprise an ordered listing of executable instructions for implementing logical functions. When multimedia acquisition module 36, multimedia analyzing module 38, and scene processing module 40, playback module 41 and any sub-modules are implemented in software, it should be noted that the system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Multimedia acquisition module 36, multimedia analyzing module 38, scene processing module 40, playback module 41 and any sub-modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
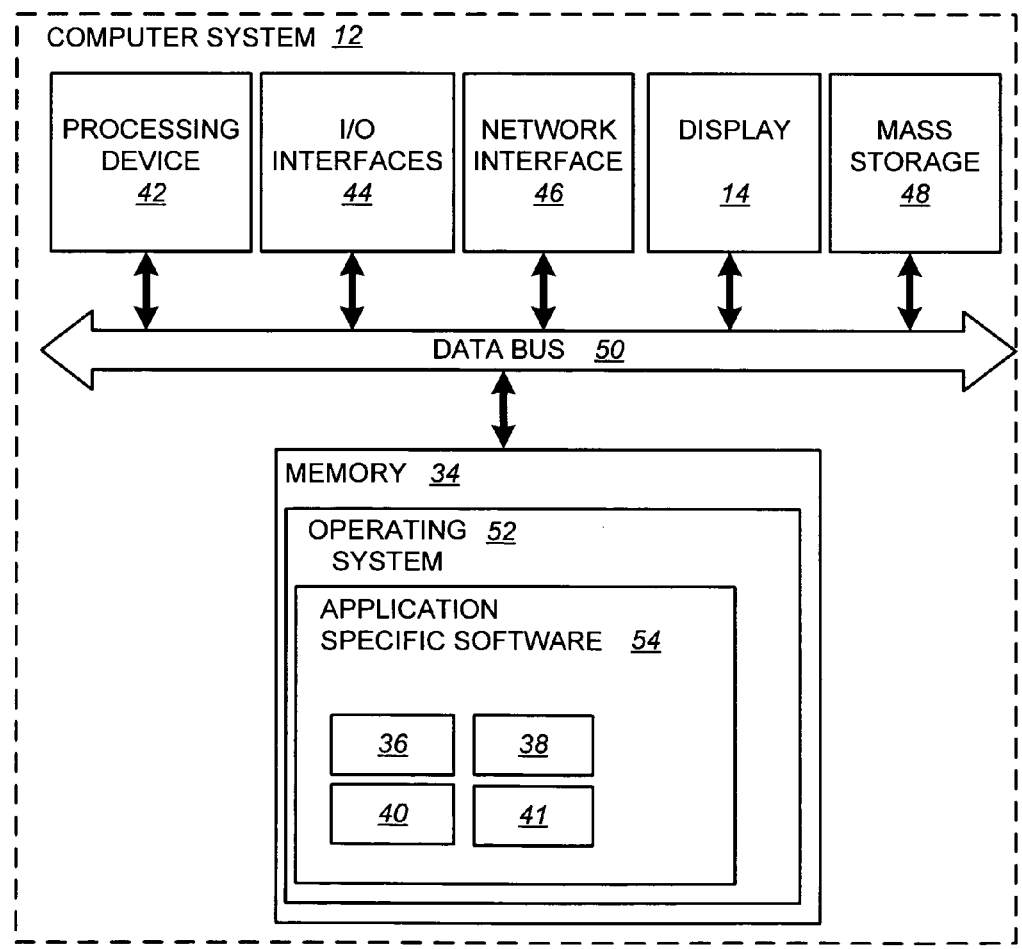
FIG. 3 depicts a block diagram of the exemplary computer system of FIG. 2, which includes executable modules for embedding scene processing information in a multimedia source.

FIG. 3 is a block diagram illustrating an exemplary embodiment of computer system 12 on which multimedia acquisition module 36, multimedia analyzing module 38, scene processing module 40 and playback module 41 may be executed. Generally speaking, the computer system 12 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computer system 12 can, for instance, comprise memory 34, a processing device 42, a number of input/output interfaces 44, a network interface device 46, and mass storage 48, wherein each of these devices are connected across a data bus 50.

Processing device 42 can include any custom made or commercially available processor, a central processing unit (CPU) or an auxiliary processor among several processors associated with the computer system 12, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 34 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 34 typically comprises a native operating system 52, one or more native applications, emulation systems, or emulated applications for any of a variety of operating systems and/or emulated hardware platforms, emulated operating systems, etc. For example, the applications may include application specific software 54, which may include any of the multimedia acquisition module 36, multimedia analyzing module 38, scene processing module 40, and playback module 41. One of ordinary skill in the art will appreciate that memory 34 can, and typically will, comprise other components which have been omitted for purposes of brevity.

Input/output interfaces 44 provide any number of interfaces for the input and output of data. For example, where the computer system 12 comprises a personal computer, these components may interface with user input device 16, which may be a keyboard or a mouse. Where the computer system 12 comprises a handheld device (e.g., PDA, mobile telephone), these components may interface with function keys or buttons, a touch sensitive screen, a stylist, etc. Display 14 can comprise a computer monitor or a plasma screen for a PC or a liquid crystal display (LCD) on a hand held device, for example.

With further reference to FIG. 3, network interface device 46 comprises various components used to transmit and/or receive data over network 22. By way of example, the network interface device 46 may include a device that can communicate with both inputs and outputs, for instance, a modulator/demodulator (e.g., a modem), wireless (e.g., radio frequency (RF)) transceiver, a telephonic interface, a bridge, a router, network card, etc.)

Figure 4:
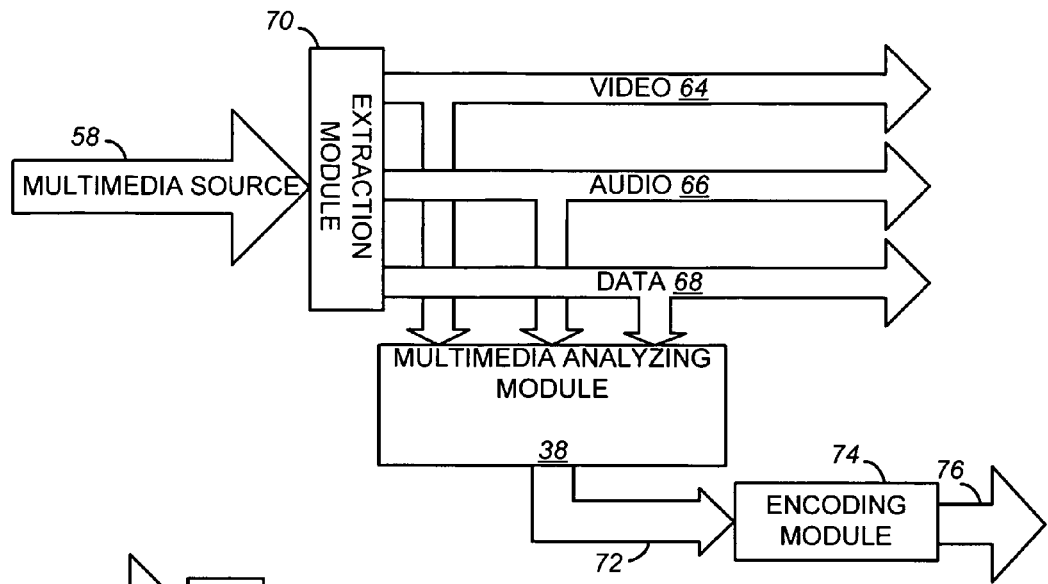
FIG. 4 depicts a block diagram of an exemplary system for generating scene processing information.

Reference is now made to FIG. 4, which depicts an embodiment of a system for embedding scene processing information in a multimedia source. Multimedia analyzing module 38, residing within the memory 34 of computer system 12, is described in more detail. While multimedia analyzing module 38 is depicted in FIG. 4 as a stand-alone module, this is not always the case. For example, multimedia analyzing module 38 may be integrated within other modules such as scene processing module 40.

Multimedia analyzing module 38 accepts a multimedia source 58 as input and analyzes the multimedia source 58 for properties related to scenes of the multimedia source. Such scene properties may be embedded within the multimedia source.

As noted above, a multimedia source may be, for example, any type of file, data stream, or digital broadcast representing any combination of audio, video, data, text, pictures, etc. For example, multimedia sources may take the format of an MPEG-1 bitstream, an MPEG-2 bitstream, an MPEG-4 bitstream, an H.264 bitstream, a 3GGP bitstream, an AVI bitstream, a WAV bitstream, a digital video (DV) bitstream, a QuickTime (QT) file, a Compact Disc Audio (CDA) bitstream, an MPEG Audio Layer III (MP3) bitstream, an MPEG Audio Layer II (MP2) bitstream Windows Media Audio (WMA) bitstream, Windows Media Video(WMV) bitstream, Advanced System Format (ASF) bitstream, or any number of other popular digital multimedia formats. The above exemplary data formats are merely examples, and it is intended that the system cover any type of multimedia source in its broadest sense.

The exemplary embodiment of FIG. 4 depicts a multimedia source 58 in the MPEG-2 format, for example. The MPEG standard, known as ISO-13818-1 is capable of multiplexing multiple streams of multimedia content into a single stream. For example, each of a video stream 64, audio stream 66, and private data stream 68, coexist within multimedia source 58. The MPEG standard allows for the combination of multiple elementary video, audio, or data streams into the same multimedia source 58. Data stream 68 may not necessarily be limited to data previously known in the art.

Typically, multimedia analyzing module 38 considers each of the audio, video, and data streams separately. Therefore, an extraction module 70 is provided to demultiplex, or extract, the video 64, audio 66 and data 68 streams from multimedia source 58. Here, multimedia source 58 is passed into extraction module 70 and video stream 64, audio stream 66, and private data stream 68 are provided to multimedia analyzing module 38 for analysis of scenes of the multimedia source 58.

Multimedia analyzing module 38 may analyze the audio, video and/or data portions of the multimedia source 58 to determine properties of the scenes contained within the source. For example, the multimedia analyzing module 38 may analyze the audio and video properties of each scene within the source to determine which scenes are important or exciting. The multimedia analyzing module 38 can determine an appropriate time span of the source that should constitute a scene, as the appropriate time span may include a plurality of frames of the source 58. As a non-limiting example, a scene may be defined as a 0.5 second span of the source 58, which would comprise fifteen frames of the source 58 if the source is a thirty frame per second (fps) video. Alternatively, the appropriate scene size can be user defined or defined in terms of the type of multimedia source 58 being input into the system. For example, it may be desirable for analysis purposes for a multimedia source 58 containing sports content to have a smaller scene size relative to a source containing a dramatic movie, as events in sports content can unfold quickly such that smaller scenes may lead to a more accurate analysis.

Multimedia analyzing module 38 may identify properties of the scene useful for subsequent scene processing. As noted above, important or exciting scenes can be identified by analyzing audio 66 and/or video 64 of the multimedia source 58. More specifically, and as noted above in reference to the method of FIG. 1, exciting and important or exciting scenes can have identifiable audio and video characteristics that can make locating and identifying them within a multimedia source possible. Multimedia analyzing module 38 can also determine where chapter marks can be placed within the stream 58.

Once multimedia analyzing module 38 has analyzed multimedia source 58 for properties related to scene processing, multimedia analyzing module 38 provides unformatted scene processing data 72 as its output, which represents the results obtained from analyzing the audio and/or video portions of the source 58. Unformatted scene processing data 72 may be represented in a predetermined format, which may be used directly by other modules of the system.

Unformatted scene processing data 72 may be also passed through an encoding module 74 to convert the format of unformatted scene processing data 72 into a format conforming to a variety of standard formats. In other embodiments, encoding module 74 may be integrated within multimedia analyzing module 38, rather than operating as a separate, stand-alone module. In many cases, it is desirable for encoding module 74 to transform unformatted scene processing data 72 into a formatted data stream conforming to that required by a particular multimedia standard, like, for example, MPEG-2, AVI, or other formats that should be appreciated. As an example, encoding module 74 may encode the unformatted scene processing data 72 into a format compatible with the private data stream of an MPEG-2 multimedia source if the incoming source 58 is an MPEG-2 stream. Accordingly, the unformatted scene processing data 72 is formatted into scene processing information (SPI) 76.

Figure 5:
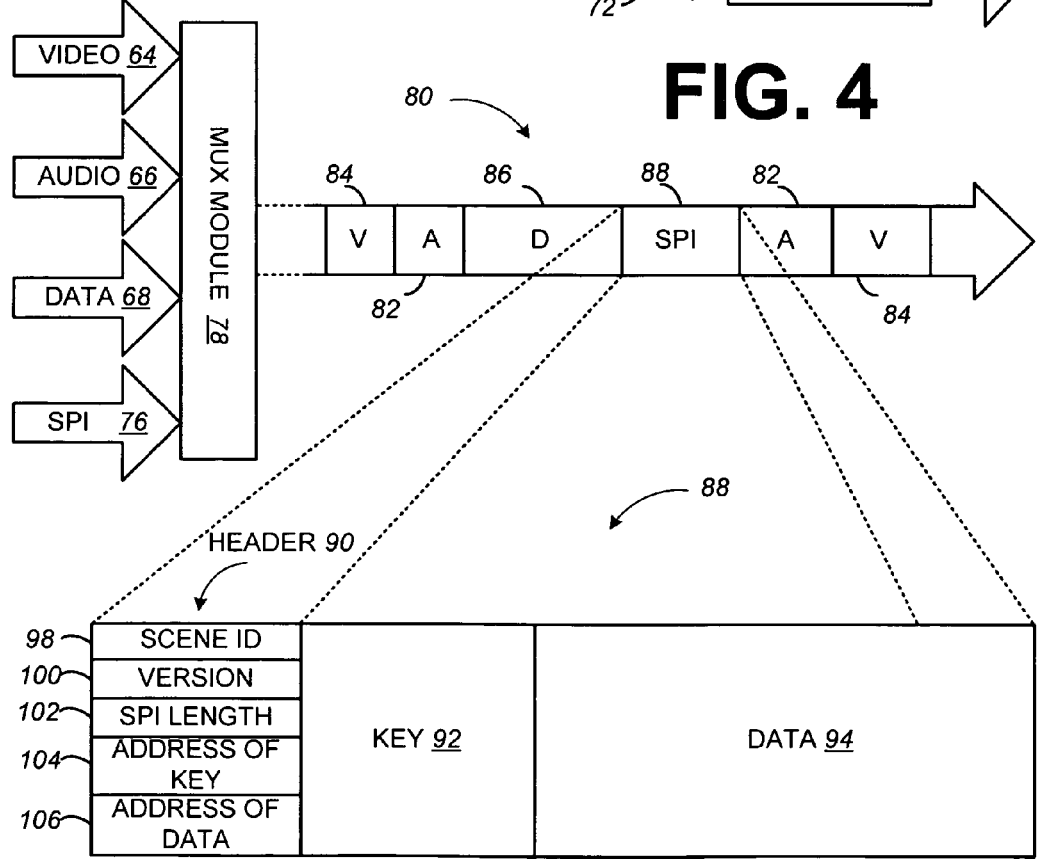
FIG. 5 depicts a block diagram of an exemplary system for embedding scene processing information in a multimedia source.

Reference is now made to FIG. 5, which depicts an exemplary system for combining the audio 66, video 64, and data 68 streams of an exemplary multimedia source 58 with scene processing information 76 into a hybrid multimedia source 80. A multiplexing (MUX) module 78 accepts the data and multiplexes, encodes or otherwise combines the data into hybrid multimedia source 80.

Hybrid multimedia stream 80 may then be stored as a file on any type of mass storage system such as a hard drive, floppy drive, optical drive, optical media, tape, etc. Alternatively, the file may be transmitted across a network to a remote host having a module configured to process hybrid multimedia stream 80. For example, multimedia processing module 40, located within computer system 12, may be enabled to read hybrid multimedia stream 80 from the attached mass storage 48.

While the embodiment of FIG. 5 depicts data streams 68 and 76 as separate data streams, in some embodiments, MUX 78, or other circuitry or software upstream of MUX 78 such as encoding module 74 or multimedia analyzing module 38, may first combine data stream 68 and scene processing information 76 into a single data stream. Therefore, for example, title information data, closed captioning data or other data in data stream 68 may coexist with scene processing information within the same elementary data stream.

As defined herein, hybrid multimedia stream 80 includes both data representing scene processing information as well as data representing a multimedia signal. A multimedia signal includes a video signal and/or an audio signal. The hybrid multimedia stream 80 may also include other types of data streams such as, for example, data stream 68. Thus, while FIG. 5 depicts all four of video stream 64, audio stream 66, data stream 68, and scene processing information 76, other embodiments of a hybrid data stream 80 may only contain scene processing information 76 and any one of video stream 64 and/or audio stream 66, for example.

Exemplary hybrid multimedia stream 80 is comprised of a plurality of alternating audio data blocks 82, video data blocks 84, private data blocks 86, and scene processing information 88. Audio data blocks 82 represent data from audio stream 66, and video data blocks 84 represent data from video stream 64. Likewise, private data block 86 represents data incorporated from private data stream 68 while scene processing information block 88 represents data originating from scene processing information 76.

Audio data blocks 82, video data blocks 84, private data blocks 86, and scene processing information blocks 88 may be encoded in any particular sequence, and each block may vary in size, and is only limited by the particular standard employed (e.g. MPEG-2, MPEG-4, etc.). For example, private data blocks 86 or scene processing information blocks 88 may be placed at the beginning, at the end, or intermittently throughout the hybrid multimedia stream 80. Alternatively, in some multimedia standards, scene processing information blocks and private data blocks may be combined into singular data blocks rather than encoded as separate blocks.

FIG. 5 also depicts an exemplary exploded view of an exemplary scene processing information block 88 which may be embedded within the hybrid multimedia stream 80. Scene processing information block 88 may include fields, such as, but not limited to, a Header Field 90, a Key Field 92, and a Data Field 94. Scene processing information block 88 may be further encapsulated within a transport packet of a particular multimedia format. For example, scene processing information block 88 may be encapsulated within a packetized elementary stream (PES) packet, as defined by the MPEG-2 standard.

Header field 90 may include subfields useful for decoding and extracting the information from analyzed attribute data block 88. Subfields may include, but are not limited to, the Scene ID Subfield 98, Version Subfield 100, SPI Length Subfield 102, Address of Key Subfield 104, and Address of Data Subfield 106. The information in Header Field 90 may vary by application and the fields described herein are merely examples of one possible format.

Key 92 and Data 94 fields may contain various key/value pairs used for scene processing information. For example, the key/value pairs contained within scene processing information block 88 can be used to indicate the start of a new scene, chapter markings or chapter numbering, or the importance value of a scene. Key/value pairs stored within a scene processing information block 88 can also indicate whether the scene is a commercial, the type of content within the multimedia source, and other attributes useful for scene processing and multimedia source manipulation in response to user requests. The above noted key/value pairs are but one possible implementation of storing scene processing information, as other alternative implementations should be appreciated in accordance with this disclosure.

Figure 6:
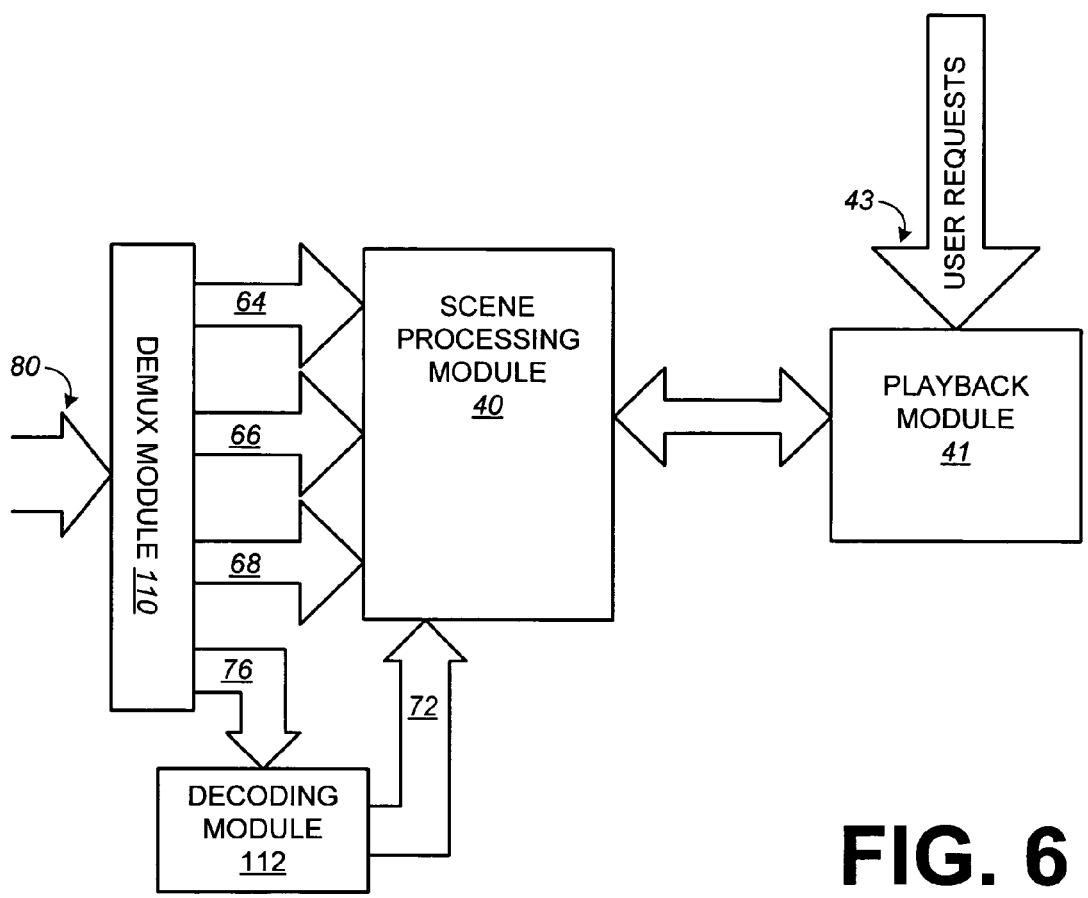
FIG. 6 depicts a block diagram of an exemplary system for extracting scene processing information from a multimedia source and generating playback of the multimedia source.

Reference is now made to FIG. 6, which depicts scene processing module 40 as well as playback module 41, which can work in conjunction to manipulate and generate playback of a hybrid multimedia source 80 containing scene processing information. According to the embodiment, a demultiplexer, DEMUX 110, separates hybrid multimedia stream 80 into individual elementary streams—video stream 64, audio stream 66, private data stream 68, and scene processing information 76. Scene processing information 76, which may include a plurality of analyzed attribute data blocks 88, is passed through decoding module 112. Decoding module 112 is configured to decode the data stored within the scene processing information blocks 88, format the data, and pass the data to scene processing module 40 which may use scene processing information within the data to process the audio or video within video stream 64 and/or audio stream 66 in response to user requests 43 and playback module 41.

Scene processing module 40 may, for example, be enabled to generate a summarized playback of hybrid multimedia stream 80 in response to user requests 43 through a playback module 41. Scene processing module can generate a summarized playback by allowing a user to view only scenes of the hybrid multimedia stream 80 having an importance value exceeding a threshold importance value, or, in other words, scenes that analyzed to be exciting or important after an analysis of video and/or audio characteristics of a multimedia source. As another non-limiting example, scene processing module can generate a summarized playback of a user specified or limited length by allowing a user to view scenes having the highest importance such that the total running times of the summarized playback is substantially equal to the user specified length or other limited length. Scene processing module 40 may also allow a user, through playback module 41, to jump to scenes tagged with chapter markings indicating the beginning of an exciting or important scene.

Accordingly, the above embodiments are merely examples of the many possible ways to embed scene processing information within a multimedia source. Similarly, the above embodiments include mere examples of how to extract and use scene processing information embedded within a hybrid bitstream. Additionally, it should be emphasized that many variations and modifications may be made to the above-described embodiments. All such modifications and variations are intended to be included herein within the scope of this disclosure and protected by the following claims.

The invention claimed is:

1. A method for multimedia processing, comprising the steps of:
   acquiring a multimedia signal containing at least one of audio data and video data,
   determining whether scene processing information is absent from the multimedia signal,
   responsive to determining that the scene processing information is absent from the multimedia signal:
      analyzing at least one of the audio data and the video data, wherein the analysis comprises assigning at least one importance value to at least one of the scenes of the multimedia signal, the at least one importance value corresponding to the importance of the at least one scene,
      embedding within the multimedia signal the scene processing information, wherein the scene processing information corresponds to the importance of scenes comprising the at least one importance value of the multimedia signal, wherein the scene processing information further comprises at least one chapter mark corresponding to a scene with an importance value exceeding a predefined threshold, the at least one chapter mark enabling a user-prompted jump to another chapter associated with another scene assigned an importance value exceeding the predefined threshold, and extracting the scene processing information from the multimedia signal, and generating playback of the multimedia signal based on the scene processing information, wherein the step of generating playback of the multimedia signal further includes:

generating a summarized playback of the multimedia signal, wherein the summarized playback comprises a selection of n scenes of the multimedia signal having the highest importance values and the number n is chosen such that the summarized playback has a running time substantially equal to a user defined running time.

2. The method of claim 1, wherein a plurality of multimedia data blocks are combined with the multimedia signal to produce a hybrid multimedia data stream.

3. The method of claim 1, wherein the step of embedding the importance value further includes multiplexing the multimedia signal with the importance value corresponding to the importance of scenes of the multimedia signal.

4. The method of claim 1, wherein the step of embedding scene processing information comprises multiplexing a bitstream representing the multimedia signal with bits representing the scene processing information without altering the perceivable multimedia signal.

5. The method of claim 1, wherein the step of embedding the importance value further comprises:

analyzing at least one of the audio data and the video data of the multimedia signal to determine the importance of scenes of the multimedia signal, and generating the importance value for at least one scene of the multimedia signal.

6. The method of claim 5, wherein the step of analyzing at least one of the audio data and the video data further includes at least one of the following:

extracting frames of the audio data from the multimedia signal and analyzing at least one of pitch, energy or tonality of the extracted frames to determine importance of scenes corresponding to the extracted frames of the audio data, or extracting frames of the video data from the multimedia source and analyzing the extracted frames to determine importance of scenes corresponding to the extracted frames of the video data.

7. The method of claim 1, wherein the step of embedding scene processing information within the multimedia signal includes any one of the following:

embedding the scene processing information at the end of the multimedia signal, embedding the scene processing information at the beginning of the multimedia signal, or embedding the scene processing information between two data blocks in the multimedia signal.

8. The method of claim 5, further comprising the steps of:

extracting the scene processing information from the multimedia signal, and generating playback of the multimedia signal based on the extracted scene processing information.

9. The method of claim 1, wherein the step of generating playback of the multimedia signal further comprises:

jumping to a scene with at least one of the at least one chapter markers.

10. The method of claim 8, wherein the step of generating the playback of the multimedia signal further comprises:

generating the summarized playback of the multimedia signal, wherein the summarized playback comprises the selection of scenes of the multimedia signal having an importance value exceeding a predefined threshold, the selection of scenes played in the order in which the selection of scenes appears in the multimedia signal.

11. A method for multimedia processing, comprising the steps of:

acquiring a multimedia signal containing at least one of audio data and video data, determining whether scene processing information is absent from the multimedia signal, responsive to determining that the scene processing information is absent from the multimedia signal:

analyzing at least one of the audio data and the video data of the multimedia signal to determine the importance of scenes of the multimedia signal, wherein the analysis comprises assigning at least one importance value to at least one of the scenes of the multimedia signal, the at least one importance value corresponding to the importance of the at least one scene, and embedding within the multimedia signal the scene processing information, wherein the scene processing information corresponds to the importance of scenes of the multimedia signal, wherein the scene processing information further comprises at least one chapter mark corresponding to a scene with an importance value exceeding a predefined threshold, the at least one chapter mark enabling a user-prompted jump to another chapter associated with another scene assigned an importance value exceeding the predefined threshold, extracting the scene processing information from the multimedia signal, and processing the multimedia signal based on the extracted scene processing information, wherein the processing further includes: generating a summarized playback of the multimedia signal, wherein the summarized playback comprises a selection of n scenes of the multimedia signal having the highest importance values and the number n is chosen such that the summarized playback has a running time substantially equal to a user defined running time.

12. A non-transitory computer readable medium having a program for multimedia processing comprising:

logic for acquiring a multimedia signal containing at least one of audio data and video data, logic that determines whether scene processing information is absent from the multimedia signal, logic for analyzing at least one of the audio data and the video data, wherein the analysis logic comprises logic for assigning at least one importance value to at least one of the scenes of the multimedia signal, the at least one importance value corresponding to the importance of the at least one scene, logic for embedding within the multimedia signal the scene processing information, wherein the scene processing information comprises the at least one importance value and a chapter mark corresponding to the at least one of the scenes, the at least one importance value exceeding a predefined threshold, the chapter mark enabling a user-prompted jump to another chapter associated with another scene assigned an importance value exceeding the predefined threshold, and wherein the logic for analyzing and the logic for embedding are executed in response to determining that the scene processing information is absent from the multimedia signal.

13. The non-transitory computer readable medium of claim 12, wherein the logic for embedding within the multimedia signal the scene processing information further includes logic for embedding the at least one importance value of the at least one of the scenes of the multimedia signal in at least one of a plurality of multimedia data blocks, wherein the plurality of multimedia data blocks is combined with the multimedia signal to produce a hybrid multimedia data stream.

14. The non-transitory computer readable medium of claim 12, wherein the logic for embedding the scene processing information further includes logic for multiplexing the multimedia signal with the at least one importance value corresponding to the importance of scenes of the multimedia signal.

15. The non-transitory computer readable medium of claim 12, wherein the logic for embedding the scene processing information comprises logic for multiplexing a bitstream representing the multimedia signal with bits representing the at least one importance value without altering the perceivable multimedia signal.

16. The non-transitory computer readable medium of claim 12, wherein the logic for embedding the scene processing information further comprises:
    logic for generating the at least one importance value for at least one scene of the multimedia signal, wherein the at least one importance value comprises at least one importance value corresponding to the importance of at least one scene of a predetermined length.

17. The non-transitory computer readable medium of claim 16, wherein the logic for analyzing at least one of the audio data and the video data further includes at least one of the following:
    logic for extracting frames of the audio data from the multimedia signal and analyzing at least one of pitch, energy or tonality of the extracted frames to determine importance of scenes corresponding to the extracted frames of the audio data, or
    logic for extracting frames of the video data from the multimedia signal and analyzing the extracted frames to determine importance of scenes corresponding to the extracted frames of the video data.

18. The non-transitory computer readable medium of claim 12, wherein the logic for embedding the scene processing information within the multimedia source includes any one of the following:
    logic for embedding the at least one importance value at the end of the multimedia signal,
    logic for embedding the at least one importance value at the beginning of the multimedia signal, or
    logic for embedding the at least one importance value between two data blocks in the multimedia signal.

19. The non-transitory computer readable medium of claim 16, further comprising:
    logic for extracting the at least one importance value from the multimedia signal, and
    logic for generating playback of the multimedia signal based on the extracted at least one importance value.

20. The non-transitory computer readable medium of claim 12, further comprising logic for generating playback of the multimedia signal, wherein the logic for generating playback further comprises:
    logic for jumping to a scene with at least one of the at least one chapter markers.

21. The non-transitory computer readable medium of claim 19, wherein the logic for generating playback of the multimedia signal further comprises:
    logic for generating a summarized playback of the multimedia signal, wherein the summarized playback comprises a selection of scenes of the multimedia source having an importance value exceeding a predefined threshold, the selection of scenes played in the order in which the selection of scenes appears in the multimedia signal.

22. The non-transitory computer readable medium of claim 19, wherein the logic for generating playback of the multimedia signal further comprises:
    logic for generating a summarized playback of the multimedia signal, wherein the summarized playback comprises a selection of n scenes of the multimedia signal having the highest importance values and the number n is chosen such that the summarized playback has a running time substantially equal to a user defined running time.

23. A non-transitory computer readable medium having a program for multimedia processing comprising:
    logic for acquiring a multimedia signal containing at least one of audio data and video data,
    logic that determines whether scene processing information is absent from the multimedia signal,
    logic for analyzing at least one of the audio data and the video data, wherein the analysis logic comprises logic for assigning at least one importance value to at least one of the scenes of the multimedia signal, the at least one importance value corresponding to the importance of the at least one scene,
    logic for embedding within the multimedia signal the scene processing information, the scene processing information comprising the at least one importance value and a chapter mark corresponding to the at least one of the scenes, the at least one importance value exceeding a predefined threshold, the chapter mark enabling a user-prompted jump to another chapter associated with another scene assigned an importance value exceeding the predefined threshold,
    logic for extracting the scene processing information from the multimedia signal,
    logic for processing the multimedia signal based on the extracted scene processing information, and
    wherein the logic for analyzing and the logic for embedding are executed in response to determining that the scene processing information is absent from the multimedia signal.

* * * * *